US008385402B2

(12) United States Patent
Eichler et al.

(10) Patent No.: US 8,385,402 B2
(45) Date of Patent: Feb. 26, 2013

(54) TRANSMISSION ELEMENT HAVING A SEGMENTED CHARACTERISTICS MAP

(75) Inventors: Michael Eichler, Rottenburg/Oberndorf (DE); Matthias Beckert, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1020 days.

(21) Appl. No.: 11/992,496

(22) PCT Filed: Sep. 14, 2006

(86) PCT No.: PCT/EP2006/066346
§ 371 (c)(1),
(2), (4) Date: Mar. 13, 2009

(87) PCT Pub. No.: WO2007/036435
PCT Pub. Date: Apr. 5, 2007

(65) Prior Publication Data
US 2009/0201981 A1 Aug. 13, 2009

(30) Foreign Application Priority Data

Sep. 30, 2005 (DE) .................. 10 2005 047 092

(51) Int. Cl.
*H03K 7/08* (2006.01)
*H03K 7/04* (2006.01)
(52) U.S. Cl. ........................ 375/238; 375/239
(58) Field of Classification Search .......... 375/238, 375/239
See application file for complete search history.

(56) References Cited

U.S. PATENT DOCUMENTS

| 7,244,215 | B2 | 7/2007 | Reinards et al. | |
|---|---|---|---|---|
| 2003/0163270 | A1* | 8/2003 | Opitz et al. | 702/86 |
| 2005/0083220 | A1 | 4/2005 | Siferd et al. | |
| 2005/0119805 | A1* | 6/2005 | Bischoff | 701/22 |
| 2005/0128658 | A1* | 6/2005 | Frenz et al. | 361/18 |
| 2006/0235602 | A1* | 10/2006 | Ishida et al. | 701/103 |

FOREIGN PATENT DOCUMENTS

| CN | 1268666 | 10/2000 |
|---|---|---|
| EP | 1482217 | 12/2004 |

OTHER PUBLICATIONS

International Search Report, PCT International Patent Application No. PCT/EP2006/066346, dated Dec. 19, 2006.
International Search Report, Annex PCT/ISA/210.

* cited by examiner

*Primary Examiner* — David Payne
*Assistant Examiner* — Brian J Stevens
(74) *Attorney, Agent, or Firm* — Kenyon & Kenyon LLP

(57) ABSTRACT

A transmission element having at least one input and at least one output is described, the transmission element delivering a functional relationship (t=F(R)) between the input quantity (R) applied to the input and the output quantity (t) that may be picked up at the output and the functional relationship (t=F(R)) being stored in a characteristics map, wherein the characteristics map comprises at least one segment having a lower limit ($N(b_i)$) and an upper limit ($N(b_{i+1})$), a function value (t_(i)=F(N(b_i))) being assigned to the lower limit ($N(b_i)$) and a function value (t(i+1)=F(N($b_{i+1}$))) being assigned to the upper limit ($N(b_{i+1})$), and the output quantity (t) being interpolated between the lower limit and the upper limit.

20 Claims, 3 Drawing Sheets

TRANSMISSION ELEMENT HAVING A SEGMENTED CHARACTERISTICS MAP

FIELD OF THE INVENTION

The present invention relates to a transmission element having at least one input and at least one output, the transmission element delivering a functional relationship between the input quantity applied to the input and the output quantity that may be picked up at the output and the functional relationship being stored in a characteristics map.

BACKGROUND INFORMATION

When a pulse-width modulated (PWM) signal is regulated with the aid of a characteristics map (F), a manipulated variable (t) is set as a function of a controlled variable (R), there being a functional relationship $t=F(R)$.

In the event of hardware implementation, so that no software algorithm is used for computing t, the values $F(R_N)$ are normally reserved for a fixed number of interpolation points N and, for all intermediary values, F(R) is set to the value of the adjacent interpolation point or an intermediary value is formed by approximation.

If controlled variable R does not reflect all the relevant influences for ascertaining the required duty factor, for example, via a temperature variation, different implementation of the circuit which is controlled by the manipulated variable, or the like, the characteristics map must be parametrizable. This is achieved by implementing all values $F(R_N)$ as programmable parameters in a memory (RAM) or by keeping a plurality x of characteristics maps $F_x(R_N)$ as constants in a non-volatile memory (ROM) in the hardware and selecting the required characteristics map via a programmable parameter.

Conventional circuits for implementing characteristics maps require a high degree of hardware complexity. An object of the present invention is therefore to optimize the hardware implementation of a parametrizable characteristics map in such a way that a small number of programmable parameters and constants are needed, while high mapping accuracy is achieved, thus reducing the hardware complexity and the costs.

SUMMARY

In accordance with an example embodiment of the present invention, a transmission element having at least one input and at least one output is provided, the transmission element delivering a functional relationship between the input quantity applied to the input and the output quantity that may be picked up at the output and the functional relationship being stored in a characteristics map, the characteristics map being composed of at least one segment having a lower limit and an upper limit, a function value being assigned to the lower limit and a function value being assigned to the upper limit, and the output quantity between the lower limit and the upper limit being interpolated. The output quantity which may be picked up at the output is preferably a pulse-width-modulated signal. The characteristics map preferably has a plurality of segments which cover the entire range of values of the input quantity. The range of values of controlled variable R is divided into a number of segments to be selected, whose limits are fixed or programmable. The duty factor is formed by linear interpolation using programmable parameters within a segment. The interpolated duty factor within a segment is computed successively directly from the quantized correction quantity to detect the analog controlled variable. It may be advantageous if the number of programmable parameters needed, which must be kept in the hardware at the same time, such as register cells or memory cells (RAM) no longer depends on the number of the selected interpolation points but only on the selected number of segments. The accuracy of the approximation may be enhanced in critical segments by a larger number of segments; the segments of higher accuracy for the individual characteristics maps may be located in different ranges of a reference variable. For the successive interpolation of the duty factor only an additional adder is needed instead of a hardware multiplier. A smaller and thus more cost-effective hardware implementation is thus possible overall.

In a refinement of the example method, it is provided that the segments transition into each other continuously. This means that the values of the output quantities make no jumps from one segment to another; the upper limit of the previous segment and the lower limit of the following segment are identical. It may be provided that, except for the first or last segment, only the lower or the upper limits are stored. If only the lower limits with values of the output quantity are stored, the lower limits of the following segment are taken as upper limits. Only the last segment, which is not followed by any further segment, is also occupied by an upper limit. A rational procedure is followed if only the values of the output quantities are stored for the upper limits.

It is preferably provided that the transmission element includes a plurality of characteristics maps which are selectable via at least one parameter. These parameters may contain different implementations of the circuit which is controlled by the manipulated variable, for example, via a temperature variation, or the like. Different characteristics maps which may be stored in a RAM or ROM, may be selected via these parameters.

The interpolation of the function values is preferably linear. However, a plurality of interpolation points may also be stored for each segment, and a polynomial interpolation may be performed, for example.

It is preferably provided that the transmission element includes a delta-sigma converter having a quantizer and an integrator, the quantizing signal generated in the quantizer being directly used for controlling the successive approximations of the manipulated variable.

Additionally, in accordance with example embodiments of the present invention, a method for operating a transmission element having at least one input and at least one output is provided, the transmission element delivering a functional relationship between the input quantity applied to the input and the output quantity that may be picked up at the output and the functional relationship being stored in a characteristics map, wherein the characteristics map comprises at least one segment having a lower limit and an upper limit, a function value being assigned to the lower limit and a function value being assigned to the upper limit, and the output quantity being interpolated between the lower limit and the upper limit.

BRIEF DESCRIPTION OF THE DRAWINGS

An exemplary embodiment of the present invention is explained below in greater detail with reference to the figures.

DETAILED DESCRIPTION OF EXAMPLE EMBODIMENTS

The range of values of a controlled variable R (see FIG. 2) is mapped in the system as a function of the required resolution, using n interpolation points, and is made available via A/D conversion as a digital value in the system.

Figure 1:
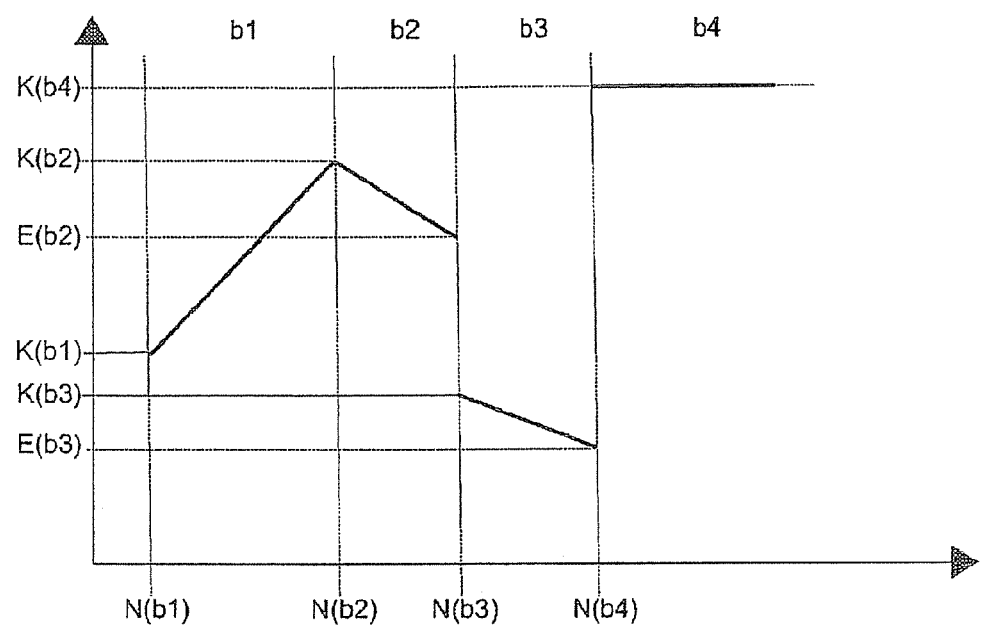
FIG. 1 shows a schematic drawing of a characteristics map according to an example embodiment of the present invention.

Characteristics map $F_x(R)$, where $x=\{1 \ldots$ number of characteristics maps$\}$, is divided into approximation segments $b_i$ where $i=1 \ldots m$) according to FIG. 1. The following programmable parameters are stored for each segment $b_i$:

limiting value $N(b_i)$ of controlled variable $R(N \in n)$ for which the approximation parameters $b_i$ apply, i.e., approximation in $b_i$ occurs when $N(b_i)<R<N(b_{i+1})$ starting value $K(b_i)$ of manipulated variable t when $R=N(b_i)$ end value $E(b_i)$ of segment $b_i$ when $n=N(b_{i+1})-1$. Parameter E does not need to be implemented if $F_x(R)$ is always constant. In that case, $F_x(b_{imax})=F_x(N(b_{i+1})))$ simply applies.

slope $P(b_i)$ for computing manipulated variable F within limits $N(b_i)<Rn<N(b_{i+1})$, where $$F(R)=P(b_i)*(n-N(b_i))+K(b_i) \text{ and}$$

$$F(R)=P(b_i)*(N(b_{i+1})-n)+E(b_i)$$

FIG. 1 shows an example of a characteristics map having four segments $b_i$, here b1, b2, b3, and b4. A starting value $K(b_i)$ and an end value $E(b_i)$ are established for each segment $b_i$. If the individual segments transition into each other continuously, as is the case, for example, of segment b1 transitioning to segment b2, the end values of the previous segment and the starting values of the following segment are always identical, i.e., in the following example, end value E(b1) of segment b1 is identical to starting value K(b2) of segment b2. If the transitions are not continuous, as is the case, for example, in the transition of segment b2 to segment b3 and of segment b3 to segment b4, a starting value $K(b_i)$ and an end value $E(b_i)$ of each segment are to be stored. Manipulated variable F is interpolated between starting value $K(b_i)$ and end value $E(b_i)$. In the present example, a linear interpolation is selected. However, basically other types of interpolation, for example, polynomial or trigonometric or the like, are also possible here. Slope $P(b_i)$ may be computed either from the starting and end values or from the corresponding values of the reference variable, or may be stored as an additional data set in the characteristics map. In this case, a lower limit $N(b_i)$, an upper limit $N(b_{i+1})$, a starting value $K(b_i)$, and an end value $E(b_i)$, as well as a slope value $P(b_i)$ belongs to each segment bi.

Figure 2:
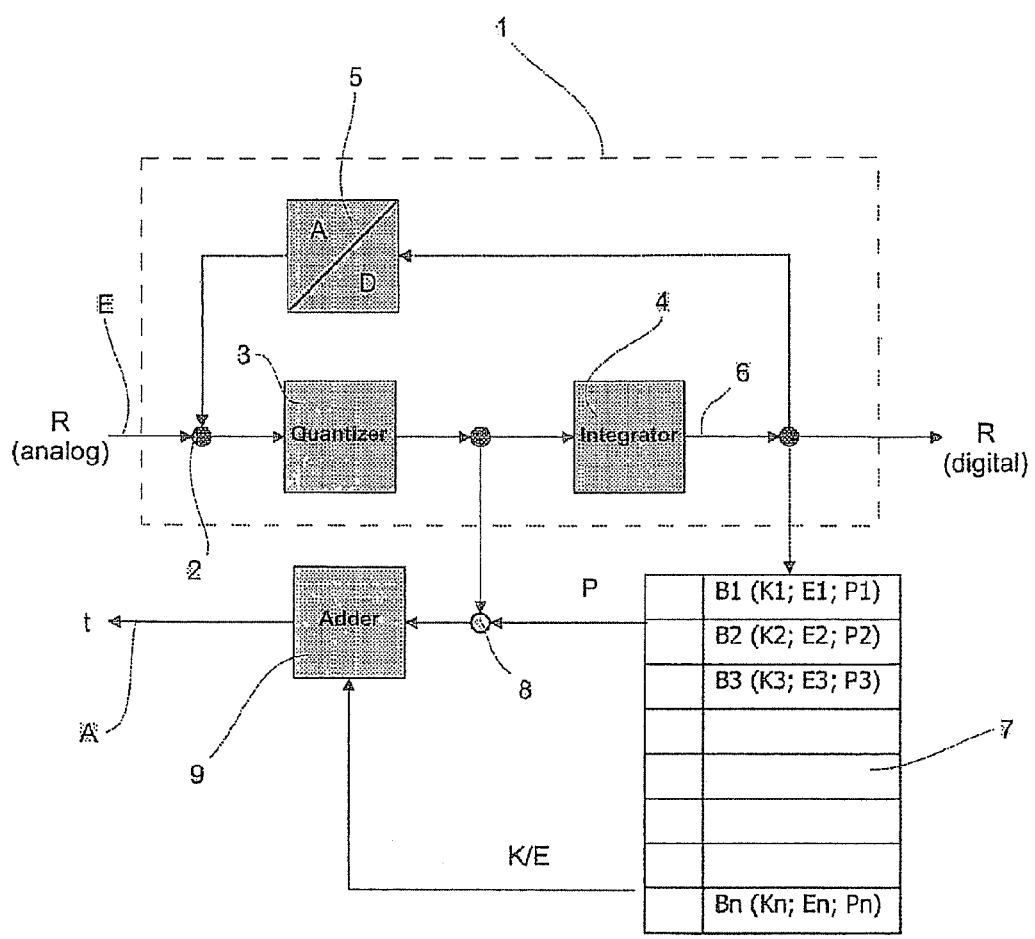
FIG. 2 shows a schematic drawing of a control unit according to an example embodiment of the present invention.

FIG. 2 shows a control chain according to an example embodiment of the present invention as a block diagram. A reference variable R is applied to an input E and is supplied to a delta-sigma converter 1. Delta-sigma converter 1 includes a subtractor 2, a quantizer 3, an integrator 4, and a digital-analog converter 5. The digitized signal appears at output 6 of integrator 4. The signal of quantizer 3 is supplied to an adder 9, at whose output A manipulated variable t appears. The current approximation segment $b_i$ is selected from a characteristics map 7 with the aid of digitized signal R, and starting value $K(b_i)$, end value $E(b_i)$, and slope $P(b_i)$ become effective for computing the manipulated variable. When approximation segment $b_i$ is changed, adder 9 is initially pre-loaded with the new starting value $K(b_i)$ and end value $E(b_i)$.

Figure 3:
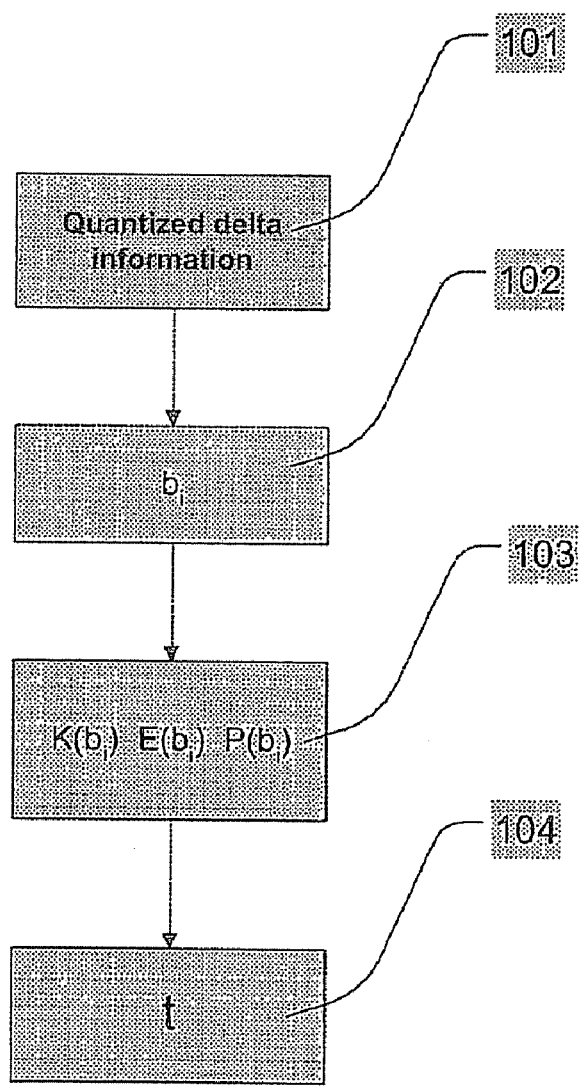
FIG. 3 shows a flow chart of the example method.

The output quantity of the regulation (PWM duty factor or the like) is generated by successive approximation using the parameter set of the current segment bi directly from the quantized delta information of the analog-digital converter for detecting the controlled variable. The parameter set is selected by comparing the digital value of controlled variable (n) with the limiting values of approximation segments $N(b_i)$. FIG. 3 shows a flow chart of the method. The quantized delta information of the analog-digital converter is determined starting with step 101. In step 102, an approximation segment $b_i$ of the quantized delta information is selected from characteristics map 7 and in step 103 starting value $K(b_i)$, end value $E(b_i)$, and slope $P(b_i)$ are determined. In step 104, manipulated variable t is determined via adder 9 using previously determined starting value $K(b_i)$, end value $E(b_i)$, and slope $P(b_i)$.

What is claimed is:

1. A non-transitory transmission element, comprising:
at least one input and at least one output, the transmission element delivering a functional relationship between an input quantity applied to the input and an output quantity that can be picked up at the output, the functional relationship being stored in a characteristics map;
wherein the characteristics map includes a plurality of segments each having a lower limit, an upper limit, a starting value, an end value, and a slope value, a first function value being assigned to the lower limit and a second function value being assigned to the upper limit,
wherein the transmission element includes a delta-sigma converter having a quantizer and an integrator, a digitized input quantity appearing at an output of the integrator, and
wherein the transmission element is adapted to use the digitized input quantity to select one of the segments from the characteristics map, and a particular starting value, end value, slope, the quantizer output becoming effective for computing a manipulated variable in such a way that the output quantity is interpolated between the lower limit and the upper limit of the selected segment.

2. The transmission element as recited in claim 1, wherein the output quantity that may be picked up at the output is a pulse-width-modulated signal.

3. The transmission element as recited in claim 1, wherein the segments transition into each other continuously.

4. The transmission element as recited in claim 1, wherein only the lower limits or the upper limits are stored.

5. The transmission element as recited in claim 1, wherein the transmission element includes a plurality of characteristics maps which are selectable via at least one parameter.

6. The transmission element as recited in claim 1, wherein the interpolation is linear.

7. The transmission element as recited in claim 1, wherein the output quantity that may be picked up at the output is a pulse-width-modulated signal, and wherein the segments transition into each other continuously.

8. The transmission element as recited in claim 7, wherein only the lower limits or the upper limits are stored.

9. The transmission element as recited in claim 8, wherein the transmission element includes a plurality of characteristics maps which are selectable via at least one parameter.

10. The transmission element as recited in claim 9, wherein the interpolation is linear.

11. A method for operating a transmission element having at least one input and at least one output, the method comprising:
delivering, by the transmission element, a functional relationship between an input quantity applied to the input and an output quantity that may be picked up at the output, the functional relationship being stored in a characteristics map, the characteristics map comprising a plurality of segments each having a lower limit, an upper limit, a starting value, an end value, and a slope value, a first function value being assigned to the lower limit and a second function value being assigned to the upper limit;

wherein the transmission element includes a delta-sigma converter having a quantizer and an integrator, a digitized input quantity appearing at the output of the integrator, and wherein using the digitized input quantity, a segment is selected from the characteristics map, and a particular starting value, end value, slope, the quantizer output become effective for computing a manipulated variable in such a way that the output quantity is interpolated between the lower limit and the upper limit of the selected segment.

12. The method as recited in claim 11, wherein the output quantity that may be picked up at the output is a pulse-width-modulated signal.

13. The method as recited in claim 11, wherein the segments transition into each other continuously.

14. The method as recited in claim 11, wherein only the lower limits or the upper limits are stored.

15. The method as recited in claim 11, wherein the transmission element includes a plurality of characteristics maps which are selectable via at least one parameter.

16. The method as recited in claim 11, wherein the interpolation is linear.

17. The method as recited in claim 11, wherein the output quantity that may be picked up at the output is a pulse-width-modulated signal, and wherein the segments transition into each other continuously.

18. The method as recited in claim 17, wherein only the lower limits or the upper limits are stored.

19. The method as recited in claim 18, wherein the transmission element includes a plurality of characteristics maps which are selectable via at least one parameter.

20. The method as recited in claim 19, wherein the interpolation is linear.

* * * * *

UNITED STATES PATENT AND TRADEMARK OFFICE
CERTIFICATE OF CORRECTION

PATENT NO. : 8,385,402 B2  Page 1 of 1
APPLICATION NO. : 11/992496
DATED : February 26, 2013
INVENTOR(S) : Eichler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1368 days.

Signed and Sealed this
First Day of September, 2015

Michelle K. Lee
*Director of the United States Patent and Trademark Office*